United States Patent
Ardanese et al.

(10) Patent No.: US 8,365,586 B2
(45) Date of Patent: Feb. 5, 2013

(54) METHOD OF MONITORING SOOT MASS IN A PARTICULATE FILTER AND MONITORING SYSTEM FOR SAME

(75) Inventors: Michelangelo Ardanese, Ann Arbor, MI (US); Raffaello Ardanese, Birmingham, MI (US); Jianwen Li, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 12/829,708

(22) Filed: Jul. 2, 2010

(65) Prior Publication Data

US 2012/0000184 A1 Jan. 5, 2012

(51) Int. Cl.
*G01M 15/10* (2006.01)
(52) U.S. Cl. .................................. 73/114.71
(58) Field of Classification Search ............... 73/114.69, 73/114.71, 114.73, 114.75, 114.76
See application file for complete search history.

(56) References Cited

U.S. PATENT DOCUMENTS

| | | | | |
|---|---|---|---|---|
| 7,434,449 B2* | 10/2008 | Kusaka et al. | ............... | 73/23.31 |
| 7,677,032 B2 | 3/2010 | Berryhill et al. | | |
| 7,684,924 B2 | 3/2010 | Darr et al. | | |
| 7,694,509 B2 | 4/2010 | Noirot et al. | | |
| 7,900,508 B2* | 3/2011 | Bardon et al. | ............. | 73/114.69 |
| 7,930,922 B2* | 4/2011 | Onishi et al. | .................. | 73/23.31 |
| 8,069,658 B2* | 12/2011 | He et al. | ........................... | 60/295 |
| 2007/0056273 A1 | 3/2007 | Wills | | |
| 2008/0078236 A1* | 4/2008 | Mital et al. | ........................ | 73/38 |
| 2009/0013665 A1* | 1/2009 | Brahma | ......................... | 60/276 |
| 2009/0287424 A1* | 11/2009 | Nakamura | ...................... | 702/24 |
| 2010/0126144 A1* | 5/2010 | He et al. | ........................... | 60/286 |
| 2010/0126145 A1* | 5/2010 | He et al. | ........................... | 60/286 |
| 2010/0313629 A1* | 12/2010 | Singh | ............................ | 73/23.31 |
| 2012/0004863 A1* | 1/2012 | Ardanese et al. | ............... | 702/47 |
| 2012/0125081 A1* | 5/2012 | Yadav et al. | .................. | 73/23.33 |
| 2012/0174652 A1* | 7/2012 | Jasinkiewicz et al. | ....... | 73/23.33 |
| 2012/0216507 A1* | 8/2012 | Nieuwstadt | ..................... | 60/274 |

OTHER PUBLICATIONS

Ohyama et al., New Concept Catalyzed DPF for Estimating Soot Loadings from Pressure Drop, SAE Technical Paper Series 2008-01-0620, 2008 World Congress, Detroit, MI, Apr. 14-17, 2008.

Markus Maly et al: "Influence of the Nitrogen Dioxide Based Regeneration on Soot Distribution;" SAE technical papers; Mar. 8, 2004; 2004-10-0823; SAE International; US.

* cited by examiner

*Primary Examiner* — Eric S McCall
(74) *Attorney, Agent, or Firm* — Quinn Law Group, PLLC

(57) ABSTRACT

A method of monitoring soot mass in a particulate filter of an exhaust system includes predicting soot mass in the particulate filter based at least partially on a pressure differential between exhaust flowing into the filter and exhaust flowing out of the filter. The predicted soot mass is then revised based at least partially on measured operating parameters indicative of mass flow rate of nitrogen oxides in exhaust flow of the exhaust system and temperature of the particulate filter.

18 Claims, 2 Drawing Sheets

METHOD OF MONITORING SOOT MASS IN A PARTICULATE FILTER AND MONITORING SYSTEM FOR SAME

TECHNICAL FIELD

The invention relates to a method of monitoring soot mass in a particulate filter, and a monitoring system for the filter.

BACKGROUND

Particulate filters are designed to remove soot from the exhaust flow of an engine, such as a diesel or gasoline internal combustion engine. When the accumulated soot reaches a predetermined amount, the filter is "regenerated" either actively, by burning off the accumulated soot, or passively, such as by the use of a catalyst. Mathematical and empirical soot models have been used to estimate the amount of soot present in the filter so that timely disposal or regeneration of the filter can be assured. One soot model predicts the amount of soot in the filter based on the pressure drop in exhaust flow through the filter (i.e., a differential pressure across the filter). Accuracy of the soot model used is important, as functioning of the particulate filter is impaired if the amount of soot present is too great. An inaccurate soot model also causes the filter to be regenerated at lower soot concentrations (grams of soot per volume of filter), which decreases fuel economy.

As passive regeneration increases, the accuracy of a differential pressure-based soot model decreases. In given temperature ranges and with given nitrogen dioxide levels in the exhaust flow, the level of passive regeneration increases, and pressure drop across the filter is not an accurate predictor of soot mass in the filter due to passive and nonhomogeneous burning of soot in the filter. Nonhomogeneous burning changes the soot distribution in the filter and therefore reduces the correlation between pressure drop over the filter and soot mass in the filter. For example, the nonhomogeneous burning causes cracks in the soot layer, reducing resistance to flow. Therefore, the pressure drop over the filter is less. If the model does not account for the effect of nonhomogeneous burning, then the model will predict a lower soot mass in the filter than actually exists.

During soot loading, some models attempt to correct a pressure drop-based model to account for nonhomogeneous burning due to passive regeneration by correlating the difference between measured soot mass (by weighing the filter) and predicted soot mass (based on pressure drop) with engine speed, engine fuel, and altitude as Nox concentration reaches a predetermined level.

SUMMARY

Passive soot burn better correlates with filter temperature, nitrogen dioxide mass rate, and soot mass present in the filter than with just pressure drop across the filter. Accordingly, a method of monitoring soot mass in a particulate filter of an exhaust system includes predicting soot mass in the particulate filter based at least partially on a pressure differential between exhaust flowing into the filter and exhaust flowing out of the filter. The pressure differential may be measured by a differential pressure sensor or calculated from a pressure sensor upstream of the filter and a modeled pressure downstream of the filter. The pressure differential-based predicted soot mass is then revised (i.e., corrected) based at least partially on measured operating parameters indicative of mass flow rate of nitrogen oxides in exhaust flow and temperature of the particulate filter. It is difficult to directly measure the filter temperature, so a parameter indicative of the filter temperature (i.e., a parameter that can be correlated with the filter temperature or from which the filter temperature can be modeled) is measured. For example, exhaust flow temperature is indicative of the temperature of the particulate filter. The pressure-differential based predicted soot mass (that predicted based only on the pressure differential across the filter) may also be revised or corrected based on the predicted soot mass itself (i.e., feedback of the predicted soot mass), which is compared along with the measured parameters to stored empirical data of the deviation between measured soot mass in the filter and estimated (pressure differential-based) soot mass for a modeled filter temperature and an average nitrogen oxide flow rate.

Because the revision of the predicted soot mass (referred to as "the correction model") is based partially on sensed operating parameters in the exhaust system, rather than on engine parameters, the model is less sensitive to changes in engine parameters that may be made during design and calibration of the engine, and thus is also widely applicable across different engine platforms. That is, data collected in establishing a database for the model is independent of engine platform.

A monitoring system for a particulate filter in an exhaust system of an engine includes a nitrogen oxide sensor positioned at least partially in exhaust flow upstream of the particulate filter, a temperature sensor positioned in operative communication with exhaust flow in the particulate filter and a pressure sensor positioned in fluid communication with an inlet of the particulate filter The pressure sensor may be a differential pressure sensor also in fluid communication with an outlet of the particulate filter. The system further includes a processor that executes a first empirical algorithm that determines a predicted soot mass in the particulate filter based on a pressure (optionally a differential pressure) measured by the pressure sensor, and a second empirical algorithm that determines an expected deviation of the predicted soot mass from actual soot mass in the filter based on operating parameters measured by the temperature sensor and the nitrogen oxide sensor and that are indicative of filter temperature and mass flow rate of nitrogen oxides, respectively. The predicted soot mass is fit to a stored database of deviations of pressure-based predicted soot mass from actual soot mass associated with a modeled filter temperature, an average nitrogen oxide flow rate, and the pressure-based predicted soot mass.

The above features and advantages and other features and advantages of the present invention are readily apparent from the following detailed description of the best modes for carrying out the invention when taken in connection with the accompanying drawings.

DETAILED DESCRIPTION

Figure 1:
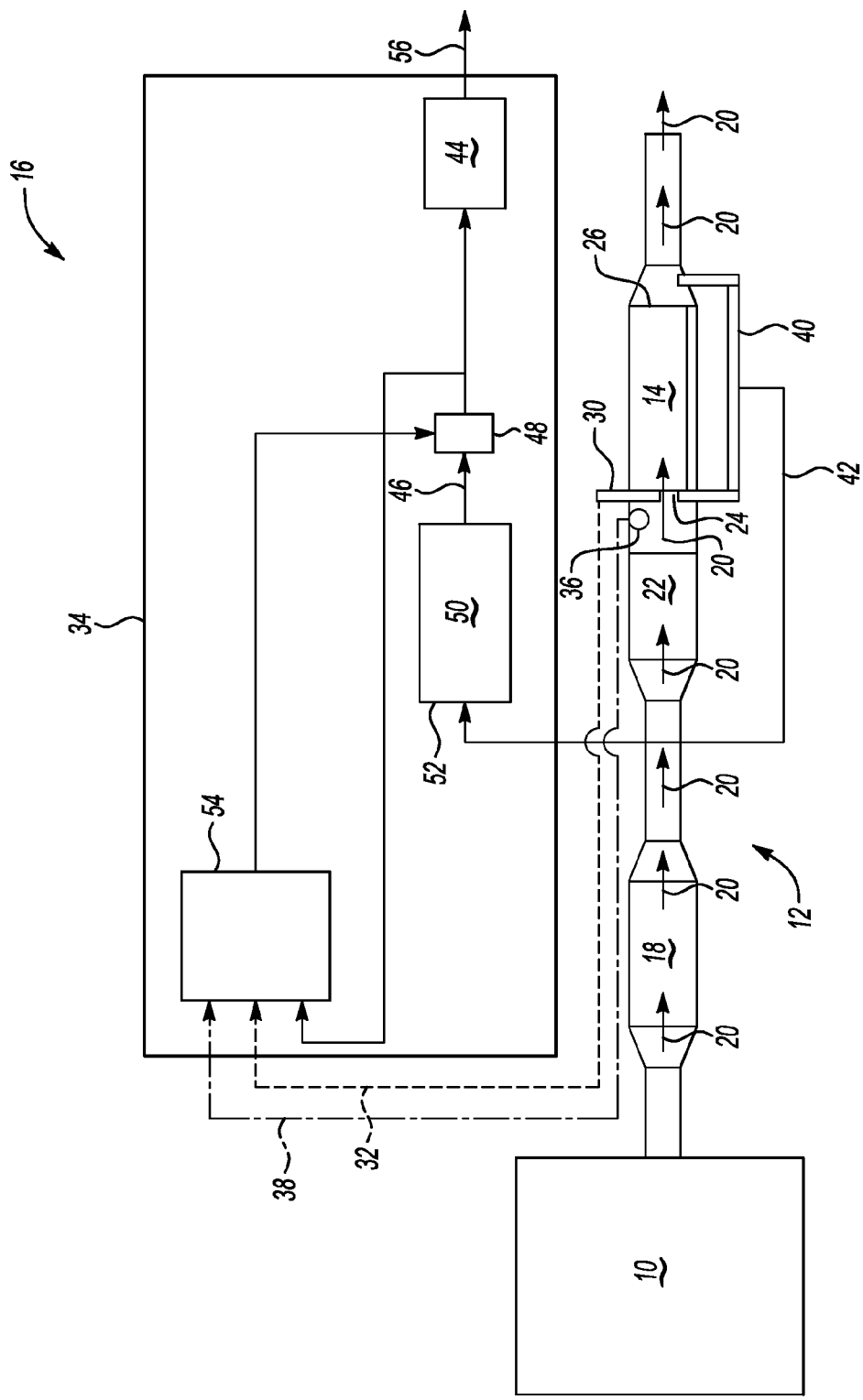
FIG. 1 is a schematic illustration of an engine with an exhaust system having a particulate filter with a filter monitoring system.

Referring to the drawings, wherein like reference numbers refer to like components throughout the several views, FIG. 1 shows an engine 10 with an exhaust system 12 that includes a particulate filter 14. A monitoring system 16 for the particulate filter 14 is operable to monitor the amount of soot mass in the particulate filter 14 in order to ensure filter performance and enhance overall fuel economy and reduction of emissions.

The exhaust system 12 includes a diesel oxidation catalyst 18 that oxidizes and burns hydrocarbons in the exhaust flow 20 exiting the engine 10. Exhaust then flows through a selective catalytic reduction catalyst 22, which converts at least some of the nitrogen oxides in the exhaust flow 20 into water and nitrogen. Exhaust then flows from an inlet 24 of the filter 14 to an outlet 26 of the filter 14, and then exits the exhaust system 12. The exhaust system 12 may be arranged with the selective catalytic reduction catalyst 22 downstream of the particulate filter 14 without affecting the function of the monitoring system 16.

The monitoring system 16 uses data reflecting real-time operating parameters in the exhaust system 12 to estimate the amount of soot in the filter 14. The monitoring system 16 includes a nitrogen oxide sensor 30 positioned at least partially in fluid communication with exhaust flow 20 upstream of the particulate filter 14. The nitrogen oxide sensor 30 is operable to measure a first operating parameter, which is the mass flow rate of nitrogen oxides in the exhaust flow 20, and to then provide a signal 32 to a controller 34. The signal 32 is utilized by the controller 34 as further described below.

The monitoring system 16 also has a temperature sensor 36 mounted in the exhaust system 12 in fluid communication with the exhaust flow 20. The temperature sensor 36 measures a second operating parameter, which is the temperature of the exhaust flow 20 entering the inlet 24, and provides a signal 38 to the controller 34. The signal 38 correlates with the measured exhaust flow temperature. An additional temperature sensor may be used to measure the exhaust temperature at the filter outlet 26. The temperature of the exhaust flow 20 is indicative of the temperature of the filter 14 in that an average filter temperature can be modeled from the exhaust flow temperature. The signal 38 is utilized by the controller 34, as further described below.

The monitoring system 16 also includes a differential pressure sensor 40 that is operable to measure a third operating parameter, which is a pressure differential between exhaust flow at the inlet 24 and exhaust flow at the outlet 26 of the filter 14. The differential pressure sensor 40 emits a signal 42 that represents the measured pressure differential. The signal 42 is utilized by the controller 34 as further described below. Alternatively, a pressure sensor that measures pressure upstream of the filter 14 may be used instead of the differential pressure sensor 40. The pressure differential across the filter can then be determined using a modeled pressure downstream of the filter 14 that is based partially on exhaust mass flow rate.

The controller 34 is configured to determine a modeled filter soot mass, also referred to herein as a revised predicted soot mass 44, which corrects for the inaccuracies of a predicted soot mass 46 that is based only on the pressure drop across the filter 14. The differential pressure-based predicted soot mass 46 is determined by mapping the signal 42 indicative of the differential pressure to empirical data 50 stored in a database 52. If a differential pressure sensor 40 is used, then the data 50 includes measured differential pressure. If instead a pressure sensor upstream of the filter 14 is used, then the data 50 includes a modeled differential pressure based on the measured pressure upstream of the filter 14 and a modeled pressure downstream of the filter 14. The database 52 correlates differential pressure with actual filter soot mass based on empirical testing of particulate filters substantially identical to filter 14. During the testing in which the empirical data is gathered and stored, one or more filters substantially identical to filter 14 are run over multiple soot loading cycles.

The controller 34 estimates a deviation 48 between actual soot mass in the filter 14 and the predicted soot mass 44 using empirical functions and empirical data stored in a processor 54, using the signals 32 and 38 from the nitrogen oxide sensor 30 and the temperature sensor 36, respectively, and using the current revised predicted soot mass 44. The deviation 48 is also referred to as a correction factor. The current revised predicted soot mass 44 is periodically revised as the deviation 48 changes with changing operating parameters (changing nitrogen oxide sensor measurements indicated by changes in signal 32, changing exhaust flow temperature measurements indicated by changes in signal 38, or changing differential pressure measurements, indicated by changes in signal 42). When the current revised predicted soot mass 44 reaches a predetermined level, the controller 34 provides an output signal 56 that indicates a recommendation to perform filter regeneration. If the filter 14 is a type that is actively regenerated by changing operating parameters to increase exhaust flow temperature to burn the soot, the signal 56 may be directed to the engine 10 to affect engine parameters to cause the increase in temperature of the exhaust flow 20.

Figure 2:
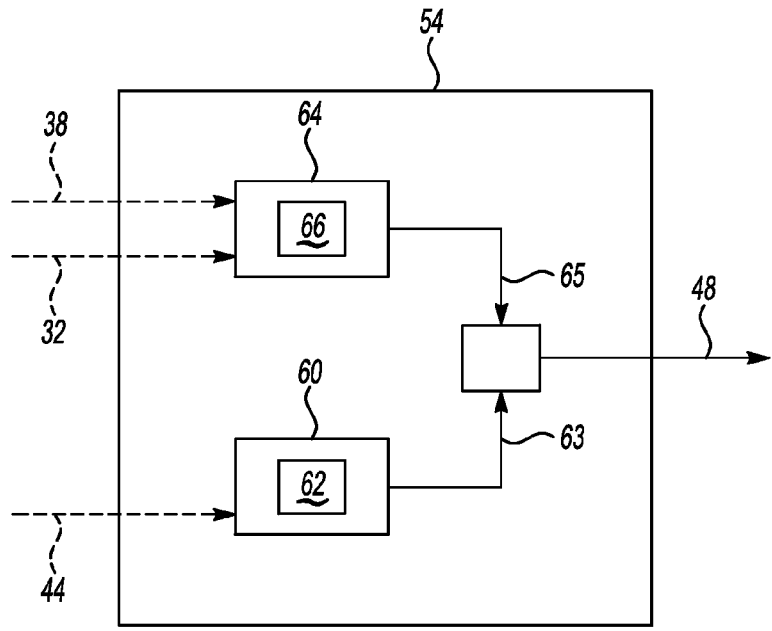
FIG. 2 is a schematic illustration of a processor used in the filter monitoring system of FIG. 1.

Referring to FIG. 2, the processor 54 is shown in more detail to represent the empirical functions and empirical data accessed by the processor 54. The current revised predicted soot mass 44 is an input to a first empirical algorithm 60 which maps the current revised predicted soot mass 44 to a stored database 62 of empirical data taken over loading cycles of one or more filters substantially identical to filter 14. The first empirical algorithm 60 is a function that relates actual measured soot mass to soot mass predicted based on the differential pressure alone. A first component 63 of the deviation 48 is based on the fitting of the revised predicted soot mass 44 to the database 62. The processor 54 also executes a second empirical algorithm 64 that accesses a stored database 66 of empirical data taken over loading cycles of one or more filters substantially identical to filter 14. The empirical data includes nitrogen oxide flow rate, exhaust flow temperature, time, actual soot mass determined by weighing the tested filter, the soot mass predicted based on the pressure differential based model (i.e., by the first empirical algorithm 60), and measured deviations in the predicted versus actual soot mass. Thus, a subset of the database 66 is a stored database of deviations. The deviation is the difference in grams between the actual soot mass and the soot mass predicted by the pressure differential-based model. The deviation may also be expressed as a mass flow rate of soot by dividing the deviation in mass by the elapsed time of loading of the tested filter, in which case the deviation may be expressed in grams per second, milligrams per second, or the like. Specifically, to establish the stored database, for every soot loading, a deviation between measured soot mass in a test filter and estimated soot mass (based on a pressure signal with no correction (either a differential pressure signal or a pressure signal from pressure measured at the filter inlet) is stored in a database and associated with (a) an averaged, modeled filter temperature, (b) an average nitrogen oxide flow rate, and (c) estimated soot mass based only on the pressure differential across the filter (measured as a pressure differential or calculated from measured pressure at the inlet and modeled pressure at the outlet, with no correction). The deviation is divided by average soot loading time and a rate is calculated. This deviation rate is associated to the three parameters (a), (b) and (c) via data fitting, therefore defining a relationship. This relationship (function) is then stored as database 66.

Thus, a second component 65 of the deviation 48 is based on the fitting (i.e., mapping) of the measured data represented by signals 32 and 38 from the nitrogen oxide sensor 30 and the temperature sensor 36, respectively, to the stored data in the database 66. The proportional weight to be given to each of the components 63, 65 of the deviation 48 may be determined by empirical testing.

Figure 3:
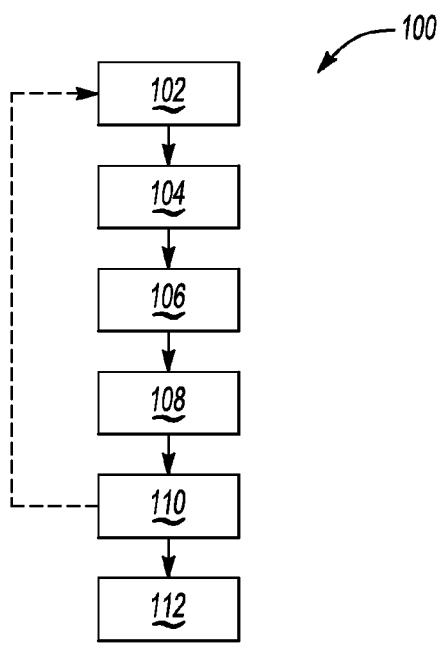
FIG. 3 is a flow diagram of a method of monitoring soot mass in the particulate filter of FIG. 1.

Referring to FIG. 3, a method 100 of monitoring the particulate filter 14 is shown as a flow diagram. The method 100 is described with respect to the monitoring system 16 of FIGS. 1 and 2, and includes step 102, measuring a first operating parameter indicative of mass flow rate of nitrogen oxides in exhaust flow in the exhaust system. Step 102 may be carried out using the nitrogen oxide sensor 30 of FIG. 1.

The method 100 further includes step 104, measuring a second operating parameter indicative of temperature of the particulate filter 14. Step 104 may be carried out using the exhaust flow temperature sensor 36. The temperature indicated by the exhaust flow temperature sensor 36 is indicative of the temperature in the particulate filter 14 (i.e., an average filter temperature may be calculated based on the measured exhaust flow temperature upstream of the filter and the modeled heat exchange between exhaust gasses, filter and environment). A person of ordinary skill in the art would understand how to calculate heat exchange between the exhaust gasses, the filter and the environment using standard thermodynamic relationships.

The method 100 further includes step 106, predicting soot mass in the particulate filter 14 based at least in part on a third operating parameter indicative of a pressure difference between the exhaust flow entering the entrance 24 and exhaust flow exiting the exit 26 of the filter 14. As described above, the third operating parameter may be a pressure measured at the inlet 24, with a pressure differential calculated therefrom using a modeled pressure at the outlet 26, or a pressure differential measured across the filter with a differential pressure sensor. Steps 102, 104 and 106 may be performed in any order or simultaneously.

Using the measured data from steps 102 and 104 and the predicted soot mass from step 106, the method 100 then proceeds to step 108, estimating a deviation 48 between the predicted soot mass from step 106 and actual soot mass in the filter 14. The deviation 48 is estimated according to the stored functions and databases accessed by the processor 54 of FIG. 2, as described above. The deviation 48 is then used in step 110, in which the predicted soot mass of step 106 is revised by the estimated deviation 48.

Steps 102, 104, 106, 108 and 110 are repeated if the revised predicted soot mass is not greater than a predetermined value. The predetermined value is the amount of soot in the filter that has been determined to be the level at which system maintenance should be performed. System maintenance may be by active regeneration or by replacing the filter 14. However, if the revised predicted soot mass is equal to or greater than the predetermined value, then the method 100 proceeds to step 112, and a filter regeneration is indicated so that soot in the filter 14 will be burned.

While the best modes for carrying out the invention have been described in detail, those familiar with the art to which this invention relates will recognize various alternative designs and embodiments for practicing the invention within the scope of the appended claims.

The invention claimed is:

1. A method of monitoring soot mass in a particulate filter of an exhaust system comprising:
predicting soot mass in the particulate filter based at least partially on a pressure differential between exhaust flowing into the filter and exhaust flowing out of the filter; and
revising the predicted soot mass based at least partially on measured operating parameters indicative of mass flow rate of nitrogen oxides in exhaust flow of the exhaust system and temperature of the particulate filter.

2. The method of claim 1, wherein the revising includes:
estimating a deviation between the predicted soot mass and actual soot mass in the filter by fitting the measured operating parameters and the predicted soot mass to a stored database of deviations between predicted soot mass and actual soot mass measured over multiple respective soot loading cycles of at least one particulate filter substantially identical to the particulate filter, with each deviation in the stored database being for a respective average modeled filter temperature and a respective average measured mass flow rate of nitrogen oxides in a respective one of the soot loading cycles.

3. The method of claim 2, further comprising:
repeating the measuring the operating parameters, the predicting soot mass, and the revising the predicted soot mass at predetermined time intervals; and
indicating a filter regeneration recommendation when the revised predicted soot mass reaches a predetermined value.

4. The method of claim 1, wherein the operating parameter indicative of mass flow rate of nitrogen oxides is measured using a nitrogen oxide sensor positioned at least partially in the exhaust flow upstream of the particulate filter.

5. The method of claim 1, wherein the operating parameter indicative of temperature of the particulate filter is measured using a temperature sensor positioned in fluid communication with the exhaust flow.

6. The method of claim 1, wherein the pressure differential is measured using a differential pressure sensor positioned in fluid communication with an inlet of the particulate filter and with an outlet of the particulate filter.

7. The method of claim 1, wherein the pressure differential is based on a pressure measured upstream of the particulate filter and a modeled pressure downstream of the particulate filter.

8. A method of monitoring soot mass in a particulate filter of an exhaust system comprising:
measuring a first operating parameter indicative of mass flow rate of nitrogen oxides in exhaust flow of the exhaust system;
measuring a second operating parameter indicative of temperature of the particulate filter;
predicting soot mass in the particulate filter based at least in part on a third operating parameter indicative of a pressure difference between pressure of exhaust flow entering the particulate filter and pressure of exhaust flow exiting the particulate filter;
estimating a deviation between the predicted soot mass and actual soot mass in the filter by fitting the measured first operating parameter, the measured second operating parameter and the predicted soot mass to a stored database of deviations between predicted soot mass and actual soot mass measured over multiple respective soot loading cycles of at least one filter that is substantially identical to the particulate filter, each of the deviations stored in the database being for a respective average modeled filter temperature and a respective average measured mass flow rate of nitrogen oxides over a respective one of the soot loading cycles; and
revising the predicted soot mass by the estimated deviation.

9. The method of claim 8, further comprising:
repeating the measuring the first operating parameter, the measuring the second operating parameter, the predicting soot mass, the estimating the deviation, and the revising the predicted soot mass at predetermined time intervals; and
indicating a filter regeneration recommendation when the revised predicted soot mass reaches a predetermined value.

10. The method of claim 8, wherein the first operating parameter is measured by a nitrogen oxide sensor positioned at least partially in the exhaust flow upstream of the particulate filter.

11. The method of claim 8, wherein the second operating parameter is measured by a temperature sensor positioned in the exhaust flow upstream of the particulate filter.

12. The method of claim 8, wherein the third operating parameter is measured by a differential pressure sensor positioned in fluid communication with an inlet of the particulate filter and with an outlet of the particulate filter.

13. The method of claim 8, wherein the pressure differential is based on a pressure measured upstream of the particulate filter and a modeled pressure downstream of the particulate filter.

14. A monitoring system for a particulate filter in an exhaust system for an engine comprising:
a nitrogen oxide sensor positioned at least partially in exhaust flow upstream of the particulate filter;
a temperature sensor positioned at least partially in exhaust flow upstream of the particulate filter;
a pressure sensor positioned in fluid communication with an inlet of the particulate filter;
a processor that executes
a first empirical algorithm that determines a predicted soot mass in the particulate filter based on a pressure measured by the pressure sensor;
a second empirical algorithm that determines an expected deviation of the predicted soot mass from an actual soot mass in the filter based on operating parameters measured by the temperature sensor and the nitrogen oxide sensor indicative of filter temperature and mass flow rate of nitrogen oxides, respectively.

15. The monitoring system of claim 14, wherein the first empirical algorithm fits the measured pressure to stored empirical data correlating the measured pressure with measured soot mass.

16. The monitoring system of claim 14, wherein the pressure sensor is a differential pressure sensor that is further positioned in fluid communication with an outlet of the particulate filter and the pressure measured by the pressure sensor is a differential pressure between the inlet and the outlet.

17. The monitoring system of claim 14, wherein the pressure sensor measures pressure upstream of the filter and the first empirical algorithm models pressure downstream of the filter and calculates a modeled differential pressure from the measured pressure and the modeled pressure downstream of the filter.

18. The monitoring system of claim 14, wherein the second empirical algorithm fits the operating parameters measured by the temperature sensor and the nitrogen oxide sensor to a stored database of deviations between predicted soot mass and actual soot mass measured over multiple respective soot loading cycles of at least one particulate filter substantially identical to the particulate filter, with each of the deviations stored in the database being for a respective average modeled filter temperature and a respective average measured mass flow rate of nitrogen oxides of a respective one of the soot loading cycles.

* * * * *